Patented Aug. 4, 1953

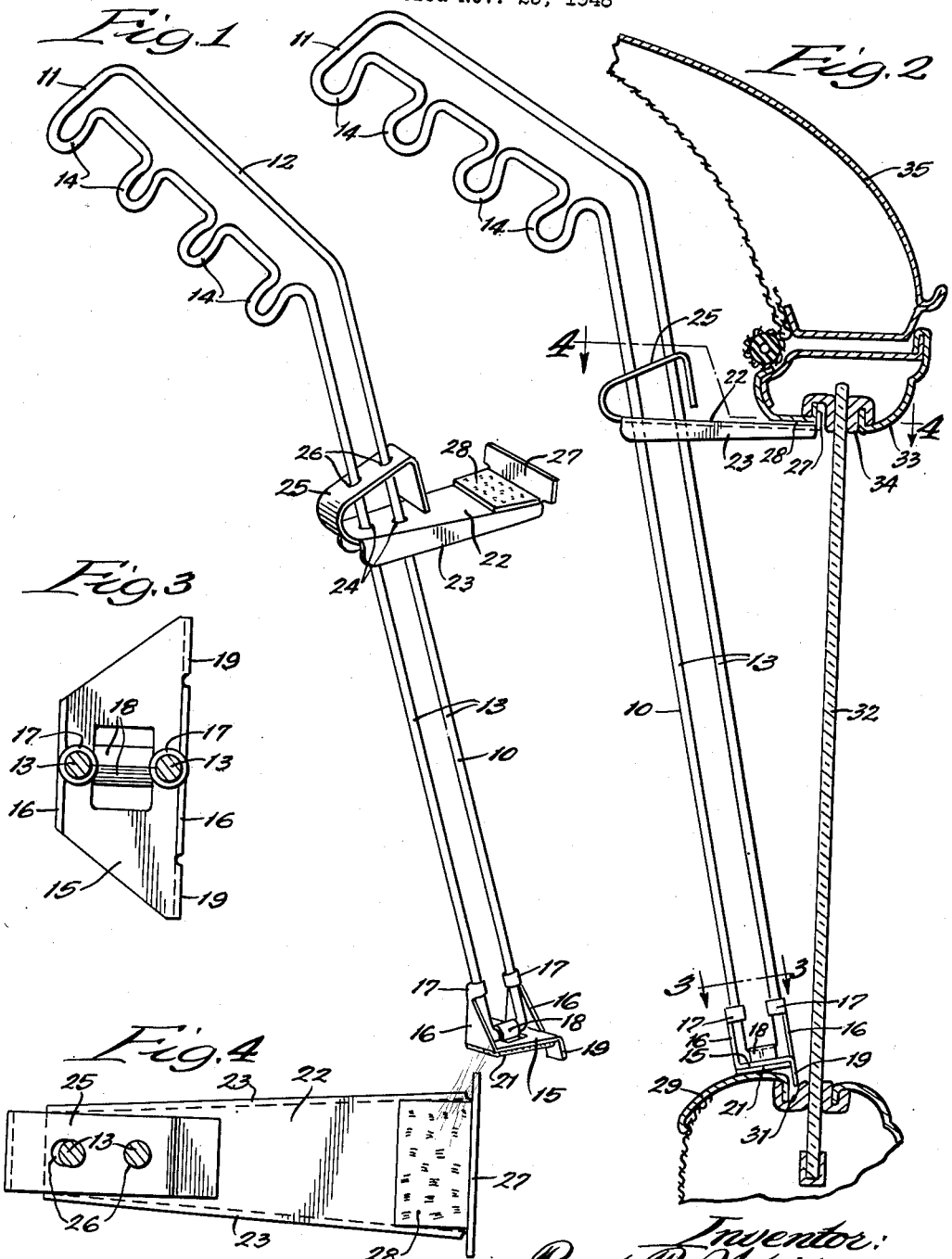

2,647,669

UNITED STATES PATENT OFFICE 2,647,669

CLOTHES RACK

Paul F. White, Glen Ellyn, Ill., assignor to Santay Corporation, Chicago, Ill., a corporation of Illinois Application November 23, 1948, Serial No. 61,657

5 Claims. (Cl. 224—42.45)

This invention relates to clothes racks and more particularly to racks for detachable mounting in the windows of vehicles and the like.

A number of different types of racks for hanging clothes in automotive vehicles have been proposed, but for the most part such racks have been designed to be suspended from the window glass. Racks of this type are necessarily of relatively small capacity and even so are apt to cause cracking or breaking of the glass. In addition, racks suspended on the glass interfere with normal opening and closing of the window and require that the window glass be in predetermined partially opened position. Racks of other types heretofore proposed which are not suspended from the glass are relatively expensive and cumbersome.

It is one of the objects of the present invention to provide a rack which can be mounted in a window frame. With this construction the entire load is carried by the frame itself which is relatively strong so that a rack of relatively large capacity can be provided without subjecting the glass to breakage and without interfering with normal opening and closing of the windows.

Another object is to provide a rack which can be easily mounted on and detached from windows of varying sizes.

Still another object is to provide a rack which is extremely simple and inexpensive to manufacture and which is easy to mount and demount. In the preferred construction the rack is formed entirely of wire with a pair of simple sheetmetal brackets.

The above and other objects and advantages of the invention will be more readily apparent when read in connection with the accompanying drawing, in which—

Figure 1 is a perspective view of a rack embodying the invention;

Figure 2 is a side elevation with parts in section illustrating the mounting of the rack in a vehicle window;

Figure 3 is a section on the line 3—3 of Figure 2; and

Figure 4 is a section on the line 4—4 of Figure 2 with the window parts omitted.

The rack of the present invention comprises an elongated straight body portion of a length slightly greater than the vertical height of the largest window in which it is to be mounted with an angular extension at its upper end formed with hook receiving portions on which conventional hangers can be hooked. At its lower end the body portion carries a foot having a flange to fit into the window panel in the lower part of the frame and a bracket is slidably mounted on the body and has a flange at its outer end to hook into the channel in the top of the window frame.

As shown the body and the angular extension thereon are integrally formed from a length of wire 10 which is looped back on itself at its upper end 11 to form two generally parallel spaced pieces of wire. The angular extension 12 is defined by relatively short lengths of wire lying at an acute angle to the parallel straight portions 13 which form the body. The lowermost length of wire in the angular extension is formed with a series of loops 14 to receive and retain the hooks on coat hangers.

At the lower end of the body portion the ends of wire are bent inward toward each other and are attached to a sheetmetal foot member 15. As shown, the foot member 15 has upstanding sides 16 formed with clips 17 at their upper ends which are bent around the wires. In its base portion the foot has clips 18 punched therefrom and folded around the ends of the wire to secure it to the foot. At one edge the foot is formed with a downwardly extending flange 19 and its lower surface may carry a pad 21 to prevent marring of the finish on the window frame.

Above the foot the body portion carries a sheetmetal bracket 22 which is preferably formed with stiffening flanges 23 at its sides and which has a pair of spaced holes 24 therein to receive parallel lengths of wire 13. At one end the bracket 22 is formed with an integral resilient flap 25 which lies at an acute angle to the bracket and which is formed with holes 26 to receive the lengths of wire 13. The flap 25 is resiliently biased away from the bracket 22 so that the bracket and flange tend to tilt and bind against the wire. In this way the bracket is frictionally held in adjusted position on the wire and can be moved by squeezing the flap toward the bracket to relieve the resilient bias. In this way the bracket can easily be adjusted to any desired position and will be held in the adjusted position by the binding action. At its outer end the bracket is formed with an upstanding flange 27 and may carry a pad 28 to prevent marring of the finish on the window frame.

In use the rack is adapted to be mounted in a vehicle window frame or in any similar frame formed with glass receiving panels. A typical vehicle window frame is illustrated in Figure 2 as including a bottom frame strip 29 formed with a central channel 31 through which the window glass 32 may move. The frame includes an upper frame member 33 similarly formed with a channel 34 into which the glass may extend. In the form shown the window frame is on a movable door fitting into an opening in the vehicle body whose roof portion is partially illustrated at 35.

To mount the rack the foot 15 is seated against the lower frame member 29 with the flange 19 projecting into the channel 31, as shown. The bracket 22 may then be slid upward on the body portion until the flange 27 thereon hooks into the channel 34 at the top of the frame. When this is done the rack is held firmly on the window frame at an angle to the glass so that it projects inward slightly from the window. The angular extension 12 in this position will lie adjacent to the roof of the vehicle and generally parallel thereto. Thus hangers may conveniently be supported from the loops 14 adjacent the roof of the vehincle and at one side thereof. It will be noted that when the rack is installed the glass 32 can be opened and closed without any interference and that the glass itself is not subjected to any strain, all of the load being taken directly by the metal window frame which is relatively strong.

While one embodiment of the invention has been shown and described in detail herein, it will be understood that this is illustrative only and is not to be taken as a definition of the scope of the invention, reference being had for this purpose to the appended claims.

What is claimed is:

1. A clothes rack for use in the window of a vehicle and the like having a channelled frame comprising an elongated body formed of spaced parallel strips, a foot at the lower end of the body having a downwardly projecting flange at one edge to fit into the channel in the bottom edge of the window frame, a bracket of relatively thin sheet material having spaced openings therein slidably receiving the body strips and to bind thereon when a tilting force is applied to the bracket, the bracket extending outward from the body and having an upwardly projecting flange at its outer end to hook in the channel in the top edge of the window frame, and extensions at the upper ends of the body strips lying at an acute angle to the body with a series of spaced hook receiving loops formed in the extension of one of the strips.

2. A clothes rack for use in the window of a vehicle and the like having a channelled frame comprising an elongated body formed of spaced parallel strips, a foot at the lower end of the body having a downwardly projecting flange at one edge to fit into the channel in the bottom edge of the window frame, a bracket of relatively thin sheet material having spaced openings therein slidably receiving the body strips, a resilient flap on the bracket lying at an acute angle thereto and having spaced openings therein slidably receiving the body strips, the flap being resiliently biased away from the bracket and cooperating with the bracket to bind against the strips, the bracket extending outward from the body and extensions at the upper ends of the body strips lying at an acute angle to the body with a series of spaced hook receiving loops formed in the extension of one of the strips.

3. A clothes rack for use in the window of a vehicle or the like having a channelled frame comprising a length of wire bent back on itself to form an elongated body defined by spaced parallel lengths of wire, a foot secured to the lengths of wire at the lower end of the body and having a downwardly projecting flange at one edge to fit into the channel at the bottom of the window frame, a bracket of thin sheet material having spaced openings therein slidably receiving the parallel lengths of wire and extending outward from the body and having an upwardly projecting flange at its outer end to hook into the channel at the top of the window frame, the wire at its upper end being bent at an acute angle to define an angular extension on the body and being formed into a series of hook receiving loops.

4. A clothes rack for use in the window of a vehicle or the like having a channelled frame comprising a length of wire bent back on itself to form an elongated body defined by spaced parallel lengths of wire, a foot secured to the lengths of wire at the lower end of the body and having a downwardly projecting flange at one edge to fit into the channel at the bottom of the window frame, a bracket of thin sheet material having spaced openings therein slidably receiving the parallel lengths of wire and extending outward from the body and having an upwardly projecting flange at its outer end to hook into the channel at the top of the window frame, a resilient flap on the bracket lying at an acute angle thereto and having spaced openings therein slidably receiving the parallel lengths of wire and biased away from the bracket to cooperate with the bracket to bind against the lengths of wire.

5. A clothes rack for use in the window of a vehicle or the like having a channelled frame comprising a length of wire bent back on itself to form an elongated body defined by spaced parallel lengths of wire, a foot secured to the lengths of wire at the lower end of the body and having a downwardly projecting flange at one edge to fit into the channel at the bottom of the window frame, a bracket of thin sheet material having spaced openings therein slidably receiving the parallel lengths of wire and extending outward from the body and having an upwardly projecting flange at its outer end to hook into the channel at the top of the window frame, a resilient flap on the bracket lying at an acute angle thereto and having spaced openings therein slidably receiving the parallel lengths of wire and biased away from the bracket to cooperate with the bracket to bind against the lengths of wire, the wire at its upper end being bent at an acute angle to define an angular extension on the body and being formed into a series of spaced hook receiving loops.

PAUL F. WHITE.

References Cited in the file of this patent

UNITED STATES PATENTS

| Number | Name | Date |
|---|---|---|
| Re. 15,628 | Wagner | June 19, 1923 |
| 995,982 | Moore et al. | June 30, 1911 |
| 1,260,206 | Kent | Mar. 19, 1918 |
| 1,557,251 | Hamlin | Oct. 13, 1925 |
| 2,025,437 | Brown | Dec. 24, 1935 |
| 2,454,368 | Auskelis et al. | Nov. 23, 1948 |
| 2,461,722 | Coons | Feb. 15, 1949 |
| 2,500,423 | Martin | Mar. 14, 1950 |
| 2,510,175 | Hess et al. | June 6, 1950 |
| 2,531,151 | Patt | Nov. 21, 1950 |